(12) United States Patent
Abrami et al.

(10) Patent No.: US 9,845,251 B2
(45) Date of Patent: Dec. 19, 2017

(54) METHOD AND PLANT FOR THE REDUCTION OF THE CONCENTRATION OF POLLUTANTS AND/OR VALUABLE ELEMENTS IN THE WATER

(71) Applicant: SEGREGATION OF METAL SYSTEM S.R.L., Rome (IT)

(72) Inventors: Antonino Abrami, Venice (IT); Fabrizio Tamburini, Venice (IT)

(73) Assignee: SEGREGATION OF METAL SYSTEM S.R.L., Rome (IT)

( * ) Notice: Subject to any disclaimer, the term of this patent is extended or adjusted under 35 U.S.C. 154(b) by 109 days.

(21) Appl. No.: 14/420,125

(22) PCT Filed: Aug. 5, 2013

(86) PCT No.: PCT/IB2013/056396
§ 371 (c)(1),
(2) Date: Feb. 6, 2015

(87) PCT Pub. No.: WO2014/024110
PCT Pub. Date: Feb. 13, 2014

(65) Prior Publication Data
US 2015/0191372 A1   Jul. 9, 2015

(30) Foreign Application Priority Data
Aug. 6, 2012 (IT) .................................. 2012A0394

(51) Int. Cl.
*C02F 1/46* (2006.01)
*C02F 1/461* (2006.01)
(Continued)

(52) U.S. Cl.
CPC ........ *C02F 1/46104* (2013.01); *C02F 1/4678* (2013.01); *C25C 1/00* (2013.01);
(Continued)

(58) Field of Classification Search
CPC C02F 1/46104; C02F 1/4678; C02F 2209/05; C02F 2209/001; C02F 2209/008;
(Continued)

(56) References Cited

U.S. PATENT DOCUMENTS

| 4,151,051 A | 4/1979 | Evans |
| 6,391,184 B1 * | 5/2002 | Orolin .................... B09C 1/002 |
| | | 204/242 |
| 2012/0186980 A1 | 7/2012 | Ramaprabhu et al. |

FOREIGN PATENT DOCUMENTS

| CN | 200981833 Y | 11/2007 |
| CN | 101481159 B | 8/2011 |

(Continued)

OTHER PUBLICATIONS

Environmental Contaminants Encyclopedia, Jul. 1, 1997; Compilers/Editors: Roy J. Irwin, National Park Service; With Assistance From Colorado State University; Student Assistant Contaminants Specialists: Mark Van Mouwerik, Lynette Stevens, Marion Dubler Seese, Wendy Basham; National Park Service Water Resources Divisions, Water Operations Branch; 1201 Oakridge Drive, • Suite 250; Fort Collins, Colorado 80525.

*Primary Examiner* — Arun S Phasge
(74) *Attorney, Agent, or Firm* — Volpe and Koenig, P.C.

(57) ABSTRACT

The present invention concerns a method for reducing the amount of polluting and/or valuable elements through application of electrolysis, in particular of the electrocapturing phenomenon. The electrolysis according to the present invention is applied permanently over time in a polluted water body. The predetermined action area (115*bis*, 115*ter*) preferably has a smaller extension than the water body. The at least one phenomenon (125*bis*, 125*ter*) is preferably powered electrically through production of electrical energy in loco through at least one renewable energy source (140). The method is suitable for purifying large expanses of water, (Continued)

like seas, lakes, lagoons and rivers, through plants operating permanently, however this does not rule out other applications.

26 Claims, 4 Drawing Sheets

(51) Int. Cl.
    *C25C 1/00*     (2006.01)
    *C02F 1/467*     (2006.01)
    *C02F 101/00*     (2006.01)
    *C02F 101/20*     (2006.01)
    *C02F 103/00*     (2006.01)
    *C02F 103/10*     (2006.01)
    *C02F 103/20*     (2006.01)

(52) U.S. Cl.
    CPC ............ *C02F 2001/46171* (2013.01); *C02F 2101/006* (2013.01); *C02F 2101/20* (2013.01); *C02F 2103/007* (2013.01); *C02F 2103/10* (2013.01); *C02F 2103/20* (2013.01); *C02F 2201/007* (2013.01); *C02F 2201/4611* (2013.01); *C02F 2201/4612* (2013.01); *C02F 2201/4614* (2013.01); *C02F 2201/46165* (2013.01); *C02F 2203/008* (2013.01); *C02F 2209/001* (2013.01); *C02F 2209/008* (2013.01); *C02F 2209/05* (2013.01); *C02F 2301/08* (2013.01)

(58) Field of Classification Search
    CPC ............ C02F 2101/20; C02F 2101/006; C02F 2001/46171; C02F 2103/10; C02F 2103/007; C02F 2103/20; C02F 2201/46165; C02F 2201/007; C02F 2201/4614; C02F 2201/4611; C02F 2201/4612; C02F 2301/08; C02F 2203/008; B63B 1/00; C25C 1/00
    See application file for complete search history.

(56) References Cited

FOREIGN PATENT DOCUMENTS

| | | |
|---|---|---|
| EP | 2258661 A1 | 12/2010 |
| JP | S50-84469 | 7/1975 |
| JP | 2000140849 A | 5/2000 |
| JP | 2002146581 A | 5/2002 |
| JP | 2002186957 A | 7/2002 |
| JP | 2004281708 A | 10/2004 |
| JP | 2007245047 A | 9/2007 |
| WO | 2008135987 A2 | 11/2008 |
| WO | 2010120882 A1 | 10/2010 |

* cited by examiner

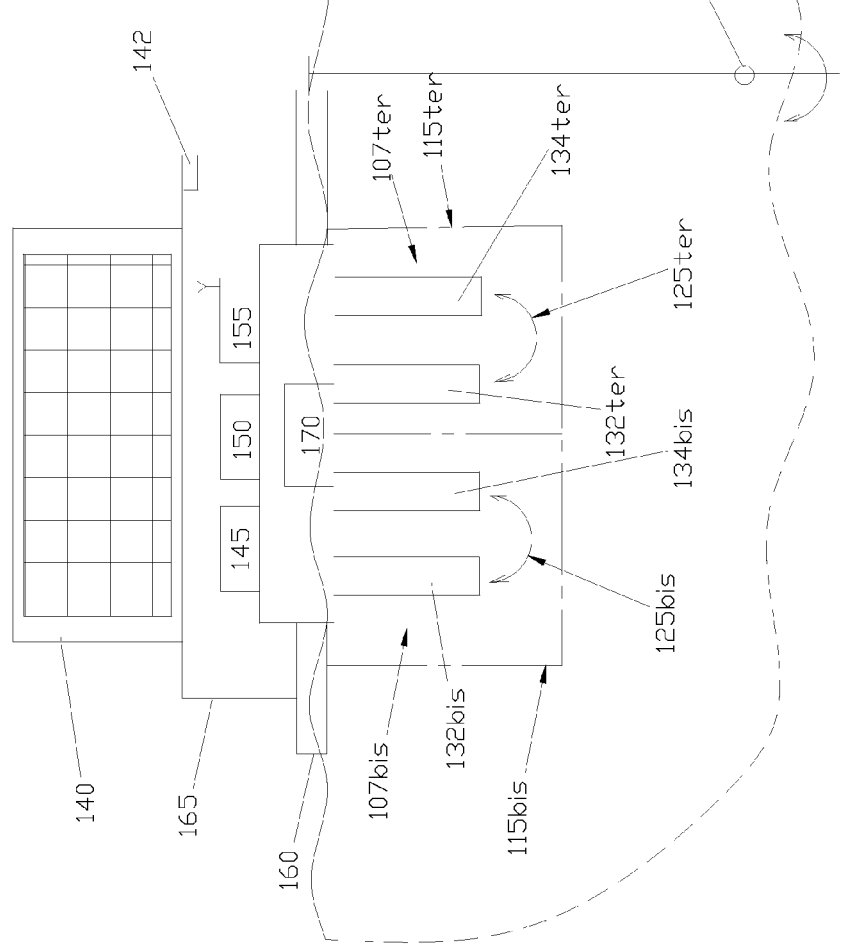

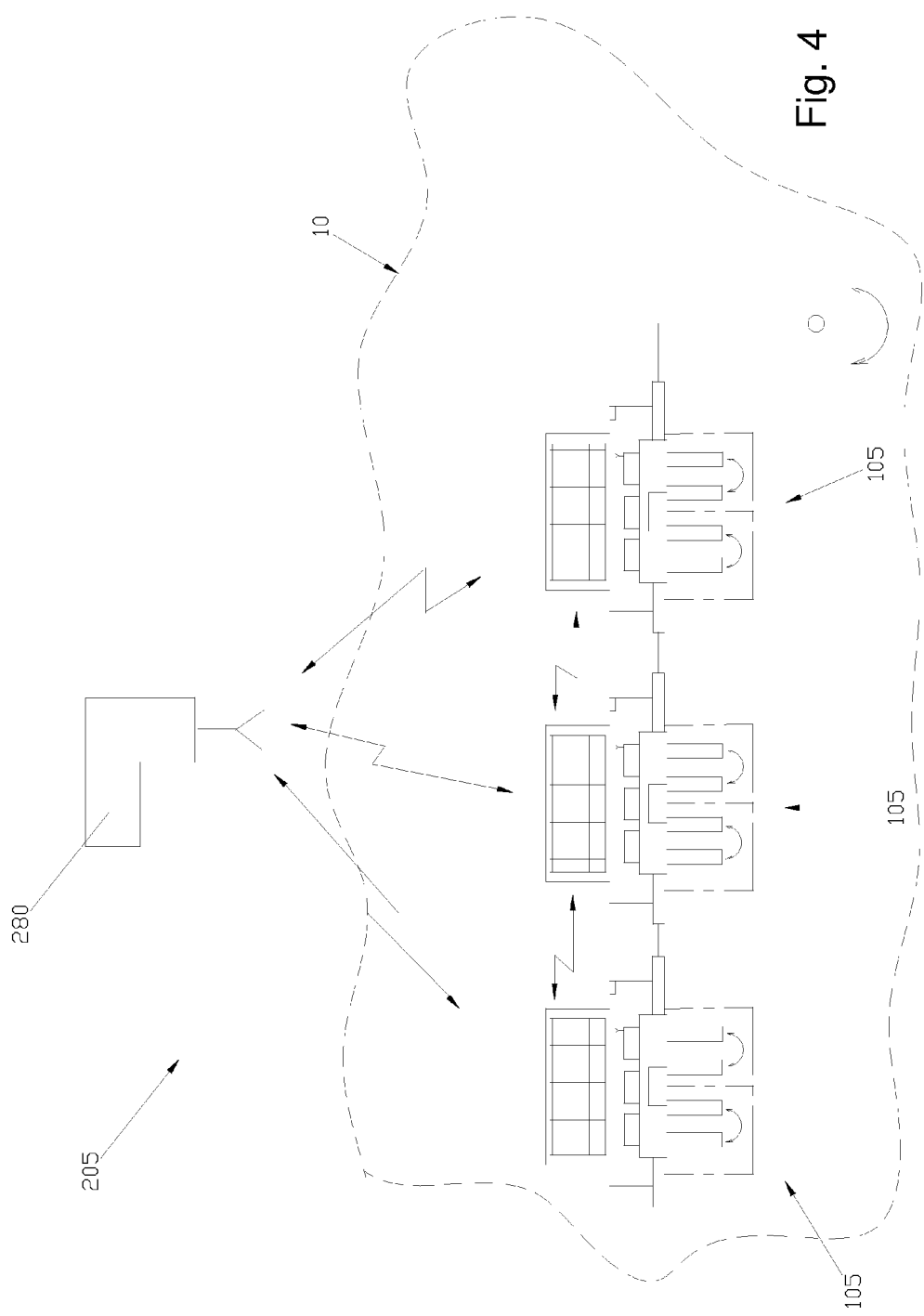

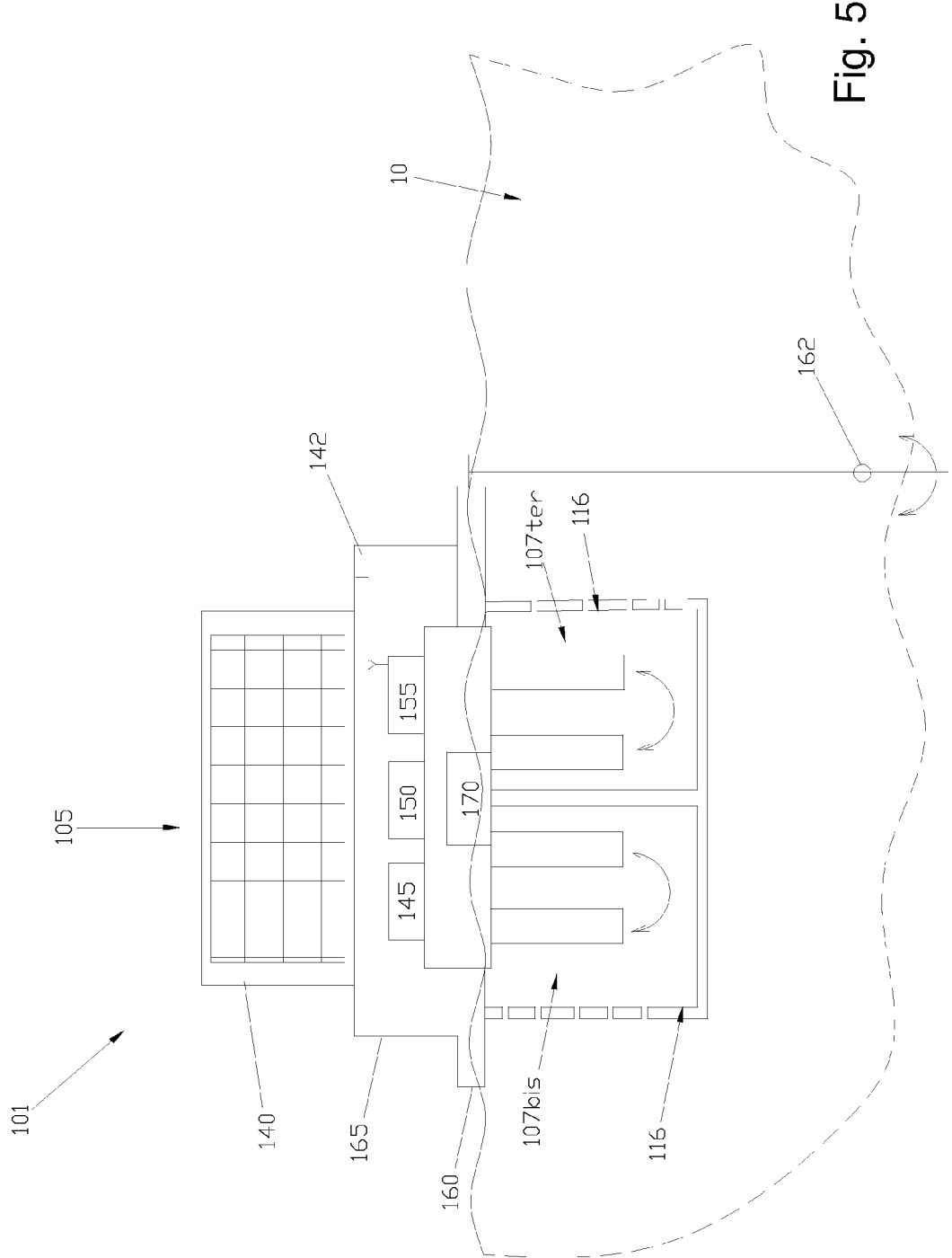

METHOD AND PLANT FOR THE REDUCTION OF THE CONCENTRATION OF POLLUTANTS AND/OR VALUABLE ELEMENTS IN THE WATER

The present invention concerns a method and a plant for reducing the concentration of polluting and/or valuable elements in water. The present invention has been developed with particular reference to the treatment of large quantities of water so that it is advantageous for use in waters arranged in open system with neighbouring waters, i.e. capable of exchanging at least material with them. However, this does not rule out other applications.

Examples of water treated according to the present invention are areas of free water located in natural basins, like seas, rivers, lakes, lagoons or in artificial basins like dams or canals, or organised water areas capable of flowing from and towards neighbouring areas. These include the water of purification basins of aqueducts and those used in acquaculture or fish farming sites or plants.

As known, the water on our planet is a precious resource for many reasons, which have recently been added to by the fact that unpolluted water is now difficult to obtain.

As known, urban developments, industrial activities and farming activities have a great influence on the pollution of water, in which it is now commonplace to find polluting materials that are harmful to human health suspended in ionic form.

Amongst the most polluting materials we note, in a non-exhaustive list, Cadmium, Lead, Mercury, Aluminium, Antimony, Arsenic, Tin, Thallium and Uranium, many of which are in metallic form.

These elements, as well as entering our body directly when water is drunk, are taken on through the food chain. A classic example is the concentration mechanism in fish or in acquaculture products that we eat on a daily basis.

Amongst the numerous bibliographic references that we could quote to quantify the extent of pollution of water on the planet and the impact on man we note the following very complete report: ENVIRONMENTAL CONTAMINANTS ENCYCLOPEDIA, Jul. 1, 1997; COMPILERS/EDITORS: ROY J. IRWIN, NATIONAL PARK SERVICE; WITH ASSISTANCE FROM COLORADO STATE UNIVERSITY; STUDENT ASSISTANT CONTAMINANTS SPECIALISTS: MARK VAN MOUWERIK, LYNETTE STEVENS, MARION DUBLER SEESE, WENDY BASHAM, NATIONAL PARK SERVICE WATER RESOURCES DIVISIONS, WATER OPERATIONS BRANCH; 1201 Oakridge Drive, Suite 250, FORT COLLINS, COLORADO 80525.

As can be seen, the aforementioned report is from 1997, and yet other previous ones could be given, to demonstrate the fact that the problem has been around for a very long time.

Moving on to the aspect of oncological research, a recent study of the university of Ferrara offered a complete summary of the damage caused in the body by these pollutants: 3.7.2013 Prof. Francesco Caritei, University of Ferrara, Inquinamento della fauna ittica e delle acque da metalli pesanti e conseguenze sanitarie nell' uomo; in particolare in campo oncologico.

The fact that such a report was only a few days prior to the filing date of the present patent application demonstrates the absence of a radical solution to the problem.

It has thus been demonstrated that in current society for many years, there has been a need to find global systems that are applicable on a large scale to reduce the pollution of our planet's water.

Such a requirement is especially great for seas, rivers, lakes and lagoons, and for all water bodies close to sources of pollution.

Also, considering the fact that the mineral resources of the planet are limited, and that such pollutants, as well as other elements present in water, can constitute an important supply source, the usefulness of a purification process could be even greater.

A general purpose of the present invention is therefore to satisfy, at least partially, such a requirement.

A preferred purpose of the present invention is to provide a process for reducing pollutants and/or valuable elements that is easy and cost-effective to carry out and that is applicable effectively on a large scale.

A further preferred purpose of the present invention is to allow recycling of the polluting and/or valuable elements making them re-useable in industry.

According to a first general aspect thereof, the present invention concerns a method for reducing the amounts of polluting and/or valuable elements through application of electrolysis, in particular of the electrocapturing phenomenon. The electrolysis according to the present invention is applied permanently over time in a polluted water body. The invention is based on the ingenious intuition that even by removing small amounts of polluting and/or valuable elements per unit time, it is possible to remove large quantities in the long term from the site to be purified. The method also does not need big interventions performed by man, since it is effective thanks to the long application period.

The method can also advantageously be applied to any polluting and/or valuable element that can have an ionic form, like for example metals and salts. It should be observed that metallic ions and salts in solution can already be present naturally in water and/or can be obtained by electrolytic dissociation, in which case is considered part of the electrocapturing phenomenon.

The following non-exhaustive table shows some polluting and/or valuable elements that can be extracted from water with the method of the present invention:

| Element | Total mass in the oceans (tonnes) | Production in 2007 (Tonnes) | Mass of water to be processed (tonnes) |
| --- | --- | --- | --- |
| Li | 2.31E+011 | 2.50E+004 | 1.40E+011 |
| Mo | 1.3E+010 | 1.87E+005 | 1.87E+013 |
| U | 4.29E+009 | 6.65E+004 | 2.02E+013 |
| V | 2.47E+009 | 5.86E+004 | 3.08E+013 |
| Cd | 1.43E+008 | 1.99E+004 | 1.81E+014 |
| Au | 1.43E+007 | 2.50E+003 | 2.27E+014 |
| Sn | 3.64E+008 | 3E+005 | 1.07E+015 |
| Ni | 8.23E+008 | 1.76E+006 | 2.81E+015 |
| Cu | 1.17E+009 | 1.56E+007 | 1.73E+016 |
| Mn | 5.20E+008 | 1.16E+007 | 2.90E+016 |
| Zn | 6.50E+009 | 1.80E+008 | 3.60E+016 |
| Al | 1.30E+009 | 3.80E+007 | 3.80E+016 |
| Cr | 2.60E+008 | 2.00E+007 | 1.00E+017 |
| Pb | 3.90E+007 | 3.55E+006 | 1.18E+017 |
| Fe | 4.42E+009 | 2.25E+009 | 6.65E+017 |
| Ti | 1.17E+006 | 6.10E+006 | 6.78E+018 |
| Co | 8.84E+006 | 3.23E+007 | 9.13E+018 | the table in the various columns gives, respectively, an estimation of the total mass of each element contained in the oceans, the amount of metal in question produced through conventional mining techniques and the amount of water that it would be necessary to process in order to be able to extract what is described in the previous column.

The capture can for example be selective, or the selection can even vary over time.

For the purposes of the present invention we consider "an" electrocapturing phenomenon to be that generated by "an" electrolytic cell. For this reason, in the case of use of a plurality of electrolytic cells we will talk of a plurality of such phenomena. Such a plurality of phenomena can be exploited to increase the amount of elements captured per hour and/or to carry out selective capturing, i.e. such that each phenomenon is associated with the capturing of just a few types of predetermined elements, or of even just one type of element, in which case we will talk of differentiated capturing. The element can, for example be selected from those in the table shown above.

The electrocapturing phenomenon comprises at least one electrodeposition phenomenon on at least one electrode (preferably insoluble, for example made from polymeric material in which conductive fibres are immersed, like carbon fibres), however we do not rule out that it may comprise other phenomena, like for example electrolytic dissociation.

According to some preferred embodiments the electrocapturing phenomenon has a power less than or equal to 100 Watt, preferably less than or equal to 50 KWatt, even more preferably less than or equal to 10 KWatt. This allows the phenomenon to be substantially permanently present in the site to be purified without being invasive. Let us consider for example a fish farming or acquaculture site, or a lagoon where there is marine fauna and flora. If the electric currents were too strong they would become actual shocks incompatible with life.

Such a phenomenon can also be supplied with a production of electrical energy in loco through renewable energy sources. This promotes the use of a plant permanently in operation to treat large quantities of water.

The electrocapturing phenomenon with the power indicated is that generated by a single electrolytic cell. In the case in which there are many cells, each of them is meant to generate an electrolysis phenomenon with a power in the indicated limits.

For the purposes of the present invention "electrolytic action area" is used to define that area of the polluted environment to be purified defined by the presence of an electrocapturing phenomenon. Said action area is preferably smaller than the water body.

According to some preferred embodiments each action area substantially corresponds to a single substantially permanent electrocapturing phenomenon, i.e. the action areas do not substantially overlap. According to a preferred convention it is possible to consider the borders of an action area to be those in which the detectable current of an electrocapturing phenomenon becomes less than $1/10$ of the current detected in the shortest path between the electrodes.

According to some preferred embodiments of the invention the density of the electrocapturing phenomena applied to the polluted water body is comprised between 1 and 10 per square meter.

In general, it should be observed that it is preferable for the action areas to be arranged to each form an open system with at least one neighbouring area of the water body, like for example an adjacent action area or a neutral area (i.e. without electrocapturing phenomenon).

Such an open system is such that the water passes (for example flows) from the at least one neighbouring area to the action area and/or vice-versa in a natural and/or induced manner.

According to a further preferred general characteristic, the electrocapturing phenomena generated each capture a single type of polluting element, so as to promote their collection and their reuse in industry.

The type of element captured can preferably be modified based on the values of at least one characterising parameter involved in the electrocapturing phenomenon, including for example: concentration of at least two polluting and/or valuable elements in the action area, current detected at the electrodes of the at least one electrocapturing phenomenon, available supply current;

According to some preferred embodiments it is possible to rotate the electrodes to arrange them according to orientations particularly favourable for electrocapturing based on the currents with which the water flows in the at least one action area.

According to other preferred embodiments it is possible to vary the intensity and size of the supply currents of the at least one electrocapturing phenomenon over time to influence the ionic mobility of at least one polluting element to be captured.

According to a second general aspect thereof, the present invention concerns a plant for reducing the concentration of polluting and/or valuable elements in water through the application of a method of the type indicated above. It comprises at least one electrolytic cell comprising at least one group of insoluble electrodes able to be immersed in a predetermined area of a polluted water body to generate at least one electrocapturing phenomenon, at least one generator of electric current that exploits at least one renewable energy arranged to power the electrolytic cell, at least one control station programmed to modify the operating parameters of the electrolytic cell, at least one support device of the electrolytic cell that floats, or using a support that can be fixed to the bottom of the water body, like for example a wharf or a stilt house frame.

In general, the preferred embodiments are those in which the cell forms a single self-powered modular unit with the at least one generator and the at least one control station. The electrocapturing device is in the form of a modular unit able to be used by itself or in association with other units. Advantageously, this makes it possible to have substantially self-powered plants with production of electrical energy in loco, the running of which foresees substantially just the maintenance costs, since the cost of the energy supply is substantially zero. Moreover, they can be left to operate for long operating times required to obtain significant capturing results.

Preferably the modular unit has a power less than or equal to 200 KWatt, preferably less than or equal to 100 KWatt, even more preferably less than or equal to 20 KWatt.

According to some preferred embodiments of the invention at least one electrode of the cell is three-dimensional and has a section of greater size with respect to the other sections, intended to be arranged perpendicular to the direction of the flow of water through the cell to promote deposition.

In general, it should be observed that plants without water holding parts around the electrodes or those that comprise one or more channels to define a predetermined flow of water from and towards the electrodes are preferable.

Some preferred embodiments of the invention comprise a feedback system between the station and at least one device for detecting at least one parameter of the water and/or at least one operating parameter of the at least one cell.

Further characteristics and advantages of the present invention will become clearer from the following detailed description of preferred embodiments thereof, made with reference to the attached drawings and given for indicating and not limiting purposes. In such drawings:

FIG. 2 is a schematic representation of a second plant comprising an alternative electrolytic device to that of FIG. 1.

FIGS. 3a and 3b are respective front and side schematic views of an electrode of the device of FIG. 2;

FIG. 4 is a schematic representation of a third plant according to the present invention, e FIG. 5 is a schematic representation of a variant of the plant of FIG. 2.

Figure 1:
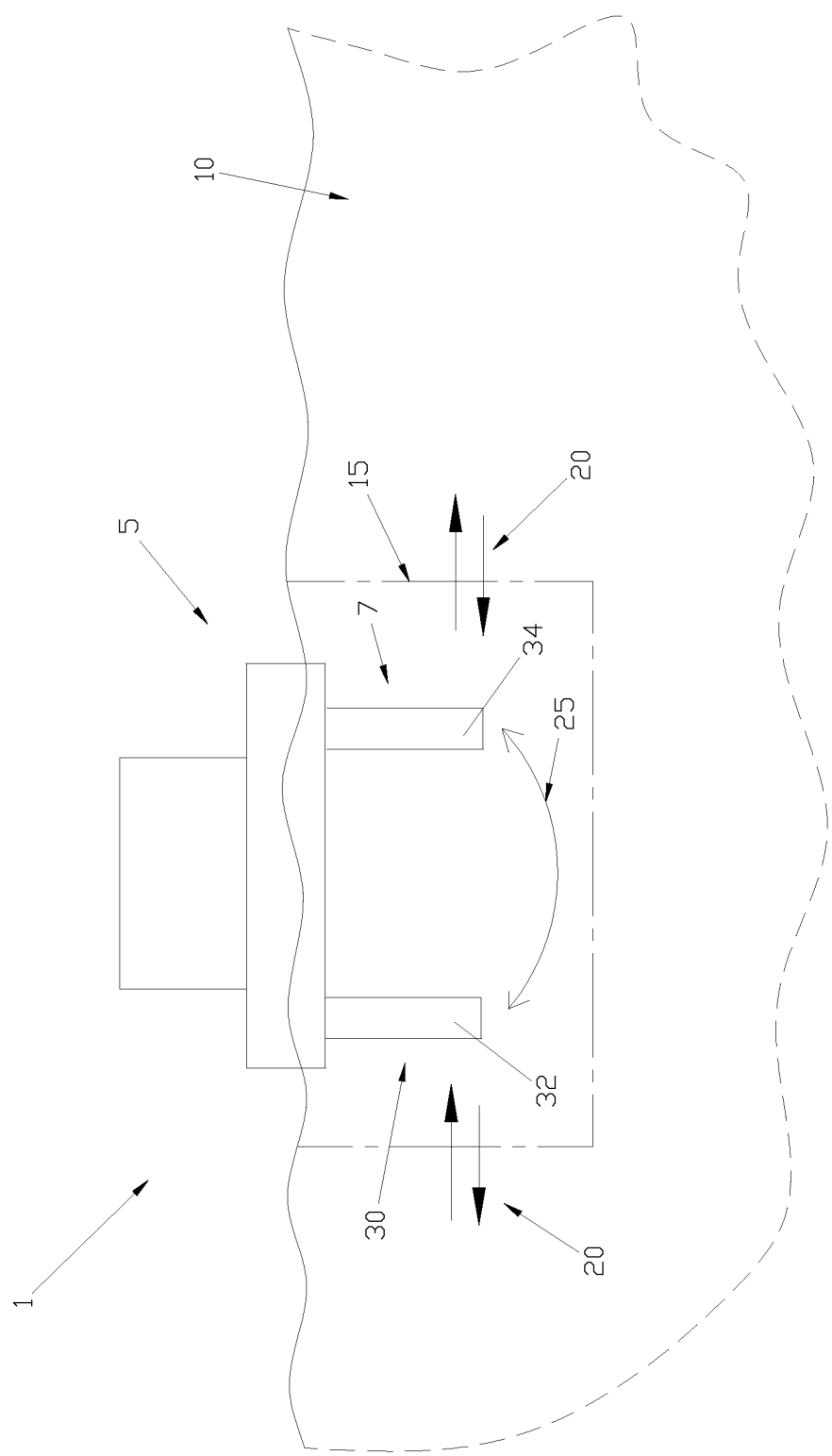
FIG. 1 is a schematic representation of a plant for reducing the concentration of polluting and/or valuable elements according to the present invention with a basic electrolytic device.

With reference to FIG. 1, a basic plant for reducing the concentration of polluting and/or valuable elements in water is shown, wholly indicated with reference numeral 1, which helps to understand the idea forming the basis of the present invention.

The plant 1 comprises a modular device for generating an electrocapturing phenomenon 5 (also simply known as "electrolytic device" or "modular unit") arranged in a water body 10, for example a marine environment, more specifically a polluted site.

The electrolytic device 5 comprises an electrolytic cell 7 (also simply called "cell"). The cell comprises a group of electrodes 30 powered by electric current and cooperating with one another to generate an electrocapturing phenomenon by electrodeposition on at least one of them of at least one type of polluting element present in the water. The group of electrodes 30 comprises at least two electrodes, i.e. at least one cathode 32 and at least one anode 34. For the purposes of the present invention the term electrolytic cell is used to define a cell with a single group of electrodes cooperating with each other, i.e. capable of producing a single electrocapturing phenomenon through electrodeposition on one or some electrodes.

The area of water in which the cell 7 is immersed and in which its electrocapturing phenomenon 25 is present is called "electrolytic action area" 15, and it is smaller than the water body to be purified 10.

The electrolytic action area is an open system, i.e. it exchanges at least water with the rest of the water body 10, for example by virtue of natural water currents 20, like in seas, in lakes, in rivers or in lagoons, or by means of forced convection.

Although the electrolytic device 5 shown comprises just one cell 7, nevertheless this does not rule out the possibility of there being a greater number of cells as will be shown hereafter. The cell 7 shown also comprises just two electrodes, nevertheless this does not rule out the possibility of the cells containing a greater number of them, for example more than one cathode and/or more than one anode electrically connected together in the electrocapturing phenomenon, for example in a bunch.

FIG. 2 represents a second plant 101 comprising a second modular electrolytic device 105, which differs from that of FIG. 1 in that it comprises two electrolytic cells 107bis and 107ter. They each generate their own electrodeposition phenomenon, respectively indicated with 125bis and 125ter. Each electrodeposition phenomenon defines its own action area 115bis and 115ter. For this reason the electrolytic device 105 is called multiple cell or multiple electrocapturing phenomenon.

The cell 107bis comprises a cathode 132bis and an anode 134bis, whereas the cell 107ter comprises a cathode 132ter and an anode 134ter.

The electrolytic device 105 also comprises a generator of electrical energy 140 that exploits at least one renewable energy source. The generator 140 represented is a solar panel, but other types of generators are possible, like for example wind generators, those based on wave motion or on tidal power, or combinations thereof.

Preferably, the electrolytic device is also equipped with an auxiliary power socket 142 to allow powering by the mains, for example in the case of an emergency or maintenance of the panel 140, or for sudden needs.

The electrolytic device 105 also comprises an accumulator device 145, a control station 150, a telecommunication device 155, a floatation device 160, an insulating screen 165 and a device 170 for detecting at least one parameter of the water and/or at least one operating parameter of the cells.

The accumulator device 145 advantageously accumulates the energy produced by the generator 140 to make it available to the cells 107bis and 107ter in a more even manner with respect to the production levels in the various hours of the day. However, this does not rule out it being absent and/or a direct power supply from a generator 140 or from a socket 142.

The station 150 is programmed and arranged to modify and manage the operating parameters of the cells based on the data detected by the detection device 170.

The telecommunication device 155 exchanges data for the station with other electrolytic devices 105 of the same plant, and/or with a remote monitoring station, for example located on solid ground. In this way the control station can modify the operating settings of the electrolytic device 105 also taking into consideration the data relating to other neighbouring electrolytic devices 105 and/or data entered wanted by an external operator. It is also possible to set the operation of the electrolytic device 105 totally manually from the remote station by sending the desired data.

The floatation device 160 is suitable for keeping the electrolytic device 105 afloat, for example it comprises a series of elements made from floating material or a floating platform. The floatation device also comprises a device for anchoring to the bottom of the water body 162.

The insulating screen 165 is used to keep all of the components of the electrolytic device isolated from the water, thus not being able to get wet.

The detection device 170 is connected to the control station to allow control in feedback of the electrolytic device 105. The feedback is preferably of the adaptive type.

For example, the detection device 170 detects the intensity and direction of marine currents and the control station commands the rotation of the electrodes, or of at least one of them, to be arranged in the most advantageous manner for them.

FIGS. 3a and 3b schematically show an electrode 130 with a section that is greater than the others. In particular, the electrode has an annular shape, so that the front section of FIG. 3a has a greater area than the lateral sections of FIG. 3b. Such a greater section can for example be intended to be kept perpendicular to the direction of the marine currents, indicated in FIG. 3b with the arrow C, so as to be hit directly by the flow of water.

FIG. 4 schematically represents a third electrocapturing plant 201 that differs from the plant 101 of FIG. 2 in that it comprises a plurality of electrolytic devices 105. They preferably are arranged in a network with one another so as to exchange data, and with a remote monitoring station 280 arranged on solid earth through the telecommunication devices 155.

In use, the plants described here can be used according to a method that foresees the following steps:

identifying a water body that is polluted and/or rich in valuable elements 10;

arranging, in such a water body 10, at least one electrolytic device 5, 105 with at least one electrolytic cell defining a predetermined electrolytic action area 15, 115bis, 115ter that is smaller than the water body 10, where such an action area is arranged to form an open system with the neighbouring areas 10, 15, 115bis, 115ter of the water body;

supplying the electrolytic cell with at least one electric current to capture at least one type of polluting element, preferably a single type, present in the water in the action area by electrolysis.

In particular, it is possible to carry out the electrocapturing by deposition on at least one electrode of elements suspended in water in the form of ions, including for example Cadmium, Lead, Mercury, Aluminium, Antimony, Arsenic, Tin, Thallium and Uranium, or more generally those shown in the table inserted in the preamble.

The water flows through the plant, and in particular through the electrolytic device, in a natural and/or induced manner, preferably natural.

Preferably, a plurality of electrolytic cells 7, 107bis, 107ter are provided and they are fed with electric current parameters such that each cell captures a single type of polluting element, the same as or different from the one captured by the other cells. This promotes the collection and reuse of the captured elements.

Preferably, at least one of the following parameters is detected: concentration of at least two polluting and/or valuable elements in the action area, current detected at the electrodes of the electrolytic cell, current available to the generator;

at least one of the polluting and/or valuable elements detected is selected and the electrolytic cell is set to capture it basing the selection on the at least one parameter detected.

the settings of the electrolytic cell are modified to change the at least one polluting element captured each time the at least one detected parameter on which the base the selection exceeds a predetermined threshold value.

In the case in which there is a plurality of cells, it is possible to modify the power supply settings of just one or some or all of the cells to change the type of polluting element captured each time the at least one detected parameter on which to base the selection exceeds a predetermined threshold value.

Thanks to the control station, it is also possible to vary the intensity and size of the power supply currents of the cell (or of the cells) over time to influence the ionic mobility of at least one polluting element to be captured.

As can be noted, up to now we have described embodiments that carry out the selective capture of the polluting and/or valuable elements based on the settings of the electrical parameters, additionally or alternatively the Applicants note that enclosing predetermined areas around each cell with selective porous membranes, i.e. permeable to just one or to predetermined polluting and/or valuable elements is also very effective. An example is illustrated in the variant of FIG. 5, where the membranes are indicated with reference numeral 116.

It should also be observed that although the electrocapturing phenomena are carried out on the water in the state in which it is in, it is also possible to condition the water to be treated to increase the efficiency of the process, for example by adding in the action areas at least one element that increases the conductivity of the liquid, like for example sodium chloride.

It should also be observed that preferably the parts that the plants are made up of, where possible, are made from recycled material, so as to increase the eco-compatibility of the invention, and/or from materials inert to electrolysis, so as not to alter the phenomena generated.

Of course, the embodiments and the variants described and illustrated up to now are purely examples and a man skilled in the art, in order to satisfy specific and contingent requirements, can bring numerous modifications and variants, including for example the combination of said embodiments and variants, all in any case covered by the scope of protection of the present invention as defined by the following claims.

The invention claimed is:

1. A method for reducing a concentration of polluting elements in water where at least one type of polluting element is captured generating at least one electrocapturing phenomenon by electrolysis (25, 125bis, 125ter) substantially permanently over time in a water body (10) that is polluted wherein the electrocapturing (25, 125bis, 125ter) is carried out selectively, and the selection varies over time as a function of at least one detected characterizing parameter, the method provides for arranging a detection device (170) and a control station (150) allowing control in feedback of an electrolytic device (105) responsible to generate the at least one electrocapturing phenomena; at least one parameter of the water and at least one operating parameter being detected through the detection device, and the operating parameters of at least one electrolytic cell of the electrolytic device performing the at least one electrocapturing phenomena are modified and managed based on the data detected by the detection device (170).

2. The method according to claim 1, wherein the feedback is of the adaptive type.

3. The method according to claim 1 wherein said electrocapturing phenomenon (25, 125bis, 125ter) comprises at least one electrodeposition phenomenon on at least one electrode (30, 130).

4. The method according to claim 1, wherein a plurality of distinct electrocapturing phenomena (125bis, 125ter) are applied substantially permanently over time in such a manner that each phenomenon captures a single type of polluting element, the same as or different from the one captured by the other phenomena.

5. The method according to claim 1, wherein the at least one electrocapturing phenomenon (25, 125bis, 125ter), and/or in the case of the presence of a plurality of electrocapturing phenomena each of them, has a power less than or equal to 100 KWatt, 50 KWatt, or 10 KWatt.

6. The method according to claim 5, wherein the at least one phenomenon (25, 125bis, 125ter) is powered electrically through production of electrical energy in loco through at least one renewable energy source (140).

7. The method according to claim 1, wherein said at least one electrocapturing phenomenon (25, 125bis, 125ter), and/or in the case of the presence of a plurality of electrocapturing phenomena, each of them, is present substantially permanently and defines, a predetermined electrolytic action area (15, 115bis, 115ter).

8. The method according to claim 7, wherein said predetermined action area (15, 115bis, 115ter) is smaller than the water body (10).

9. The method according to claim 7, wherein each electrocapturing phenomenon (125bis, 125ter) is present in, and defines, a respective action area (15, 115bis, 115ter) of the water body substantially different from the area (15, 115bis, 115ter) in which at least one other electrocapturing phenomenon (125bis, 125ter) is present.

10. The method according to claim 7, wherein borders of said action area (15, 115bis, 115ter) are substantially those in which the detectable current of an electrocapturing phenomenon becomes less than $\frac{1}{10}$ of the current detected in the shortest path between the electrodes that generate it.

11. The method according to claim 7, further comprising the step of detecting at least one of the following parameters: concentration of at least two polluting elements in the action area, current detected at the electrodes of the at least one electrocapturing phenomenon, supply current available;
selecting at least one of the polluting elements detected and setting the parameters of the at least one electrocapturing phenomenon (25, 125bis, 125ter) for its capture basing the selection on the at least one parameter detected,
modifying the setting of the electrocapturing phenomenon (25, 125bis, 125ter) to change the at least one polluting element captured when the at least one detected parameter on which to base the selection exceeds a predetermined threshold value.

12. The method according to claim 7, wherein said action area (15, 115bis, 115ter) is arranged to form an open system with at least one neighboring area of the water body (10, 115bis, 115ter).

13. The method according to claim 12, wherein said electrolytic action area (15, 115bis, 115ter) arranged to form an open system in the water body is arranged so that the water passes from the at least one neighboring area to the action area and/or vice-versa in a natural and/or induced manner (20).

14. The method according to claim 1, wherein the density of the electrocapturing phenomena (25, 125bis, 125ter) applied to the water body is comprised between 1 and 10 per square meter.

15. The method according to claim 1, further comprising the step of substantially permanently applying at least two electrocapturing phenomena (25, 125bis, 125ter) and of supplying each of them with electric current parameters such that each of the two captures at least one type of polluting and/or valuable element different from that or those captured by the other.

16. The method according to claim 1, further comprising the step of detecting at least one characterizing parameter of the flow with which the water flows in the at least one action area, and modifying, based on said parameter, the orientation and/or arrangement of at least one electrode (30, 130) present in the action area (15, 115bis, 115ter) and suitable for generating the at least one electrocapturing phenomenon (25, 125bis, 125ter).

17. The method according to claim 1, wherein intensity and size of the supply currents of the at least one electrocapturing phenomenon (25, 125bis, 125ter) are varied over time to influence the ion mobility of at least one polluting element to be captured.

18. The method according to claim 1, wherein the at least one electrocapturing phenomenon (25, 125bis, 125ter) is monitored remotely through a telecommunication system (155).

19. The method according to claim 1, wherein the at least one polluting element captured by electrolysis is collected and sent to industry for reuse.

20. A plant for reducing the concentration of polluting elements in water through the application of a method according to claim 1, comprising at least one electrolytic cell (7, 107bis, 107ter) comprising at least one group of insoluble electrodes (30, 130) able to be immersed in a predetermined area of a water body (10) that is polluted to generate at least one electrocapturing phenomenon (25, 125bis, 125ter), at least one generator of electric current (140) that exploits at least one renewable energy arranged to supply the electrolytic cell (7, 107bis, 107ter), at least one control station (150) programmed to modify the operating parameters of the electrolytic cell, at least one support device (160) of the electrolytic cell that floats or using a support that can be fixed to the bottom of the water body (162), wherein the plant comprises at least one device (170) for detecting at least one parameter of the water and/or at least one operating parameter of the at least one cell (7, 107bis, 107ter), said detection device (170) being in communication with the station (150) so as to form a feedback system, the station (150) is programmed and arranged to modify and manage the operating parameters of the cells based on the data detected by the detection device (170).

21. The plant according to claim 20, further comprising a self-powered modular unit generating at least one electrocapturing phenomenon (5, 105) comprising the at least one electrolytic cell (7, 107bis, 107ter), the at least one generator (140) and the at least one control station (150).

22. The plant according to claim 21, wherein the modular unit (5, 105) has a power less than or equal to 200 KWatt.

23. The plant according to claim 21, further comprising a plurality of devices generating at least one electrocapturing phenomenon (5, 105), and a control station (280), remote with respect to the place of application of the electrolysis (10), connected to said electrolytic generator devices through a telecommunication system (155).

24. The plant according to claim 20, wherein at least one electrode (30, 130) is three-dimensional and has a section of greater size with respect to the other sections and intended to be arranged perpendicular to the direction of the flow (C) of water through the cell (7, 107bis, 107ter).

25. The plant according to claim 20, wherein the plant lacks parts for total holding of the water around the electrodes (30, 130), comprising one or more channels to define a predetermined flow of water from and to the electrodes and/or one or more selective membranes (116).

26. The plant according to claim 20, wherein the feedback is of adaptive type.

* * * * *